March 31, 1959  N. B. WILLIAMSON  2,879,831
SEAT ATTACHMENT FOR GOLF CARTS
Filed Feb. 10, 1955  3 Sheets-Sheet 2
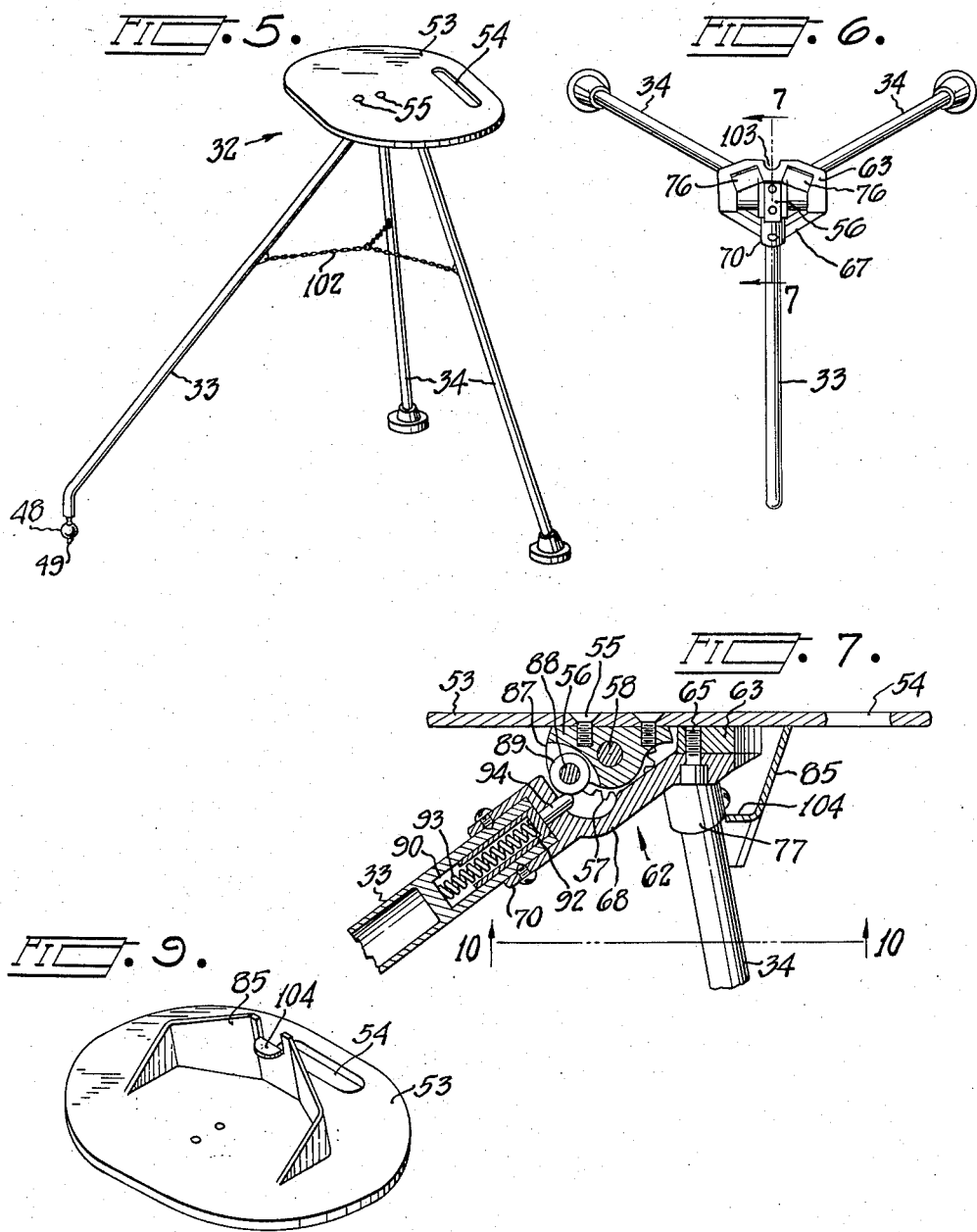
INVENTOR
NORMAN BRUCE WILLIAMSON
BY
Cook and Schermerhorn
ATTORNEY March 31, 1959
N. B. WILLIAMSON
2,879,831
SEAT ATTACHMENT FOR GOLF CARTS
Filed Feb. 10, 1955
3 Sheets—Sheet 3
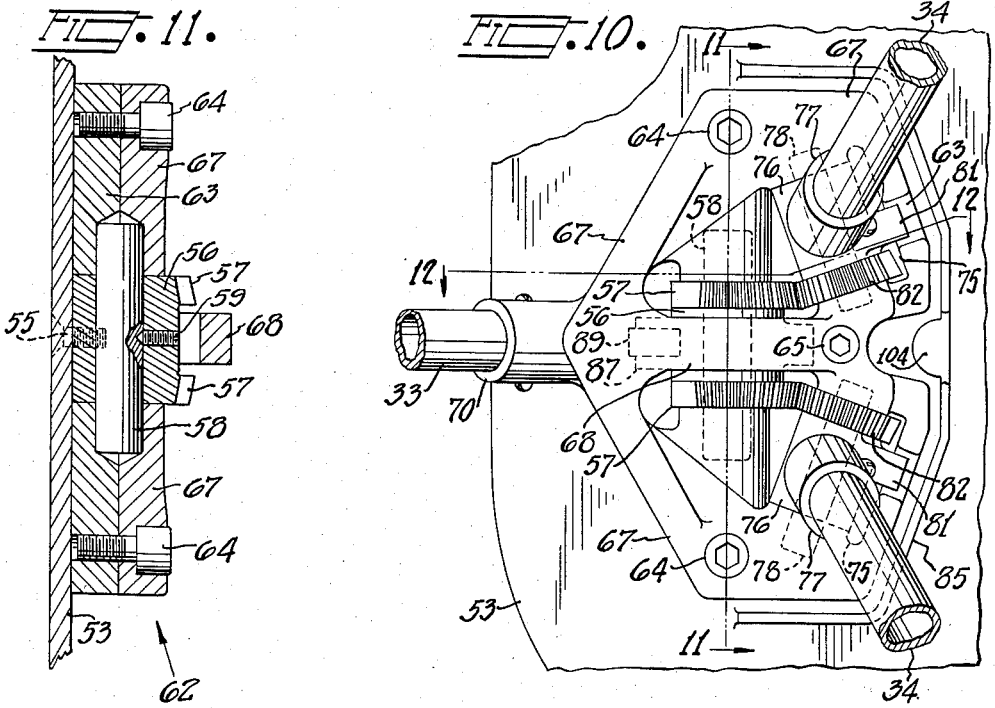
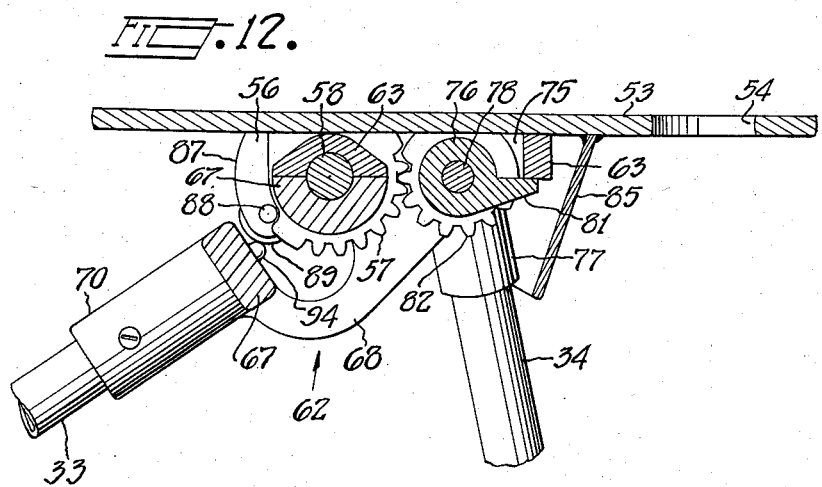
INVENTOR
NORMAN BRUCE WILLIAMSON
BY
Cook and Schermerhorn
ATTORNEYS

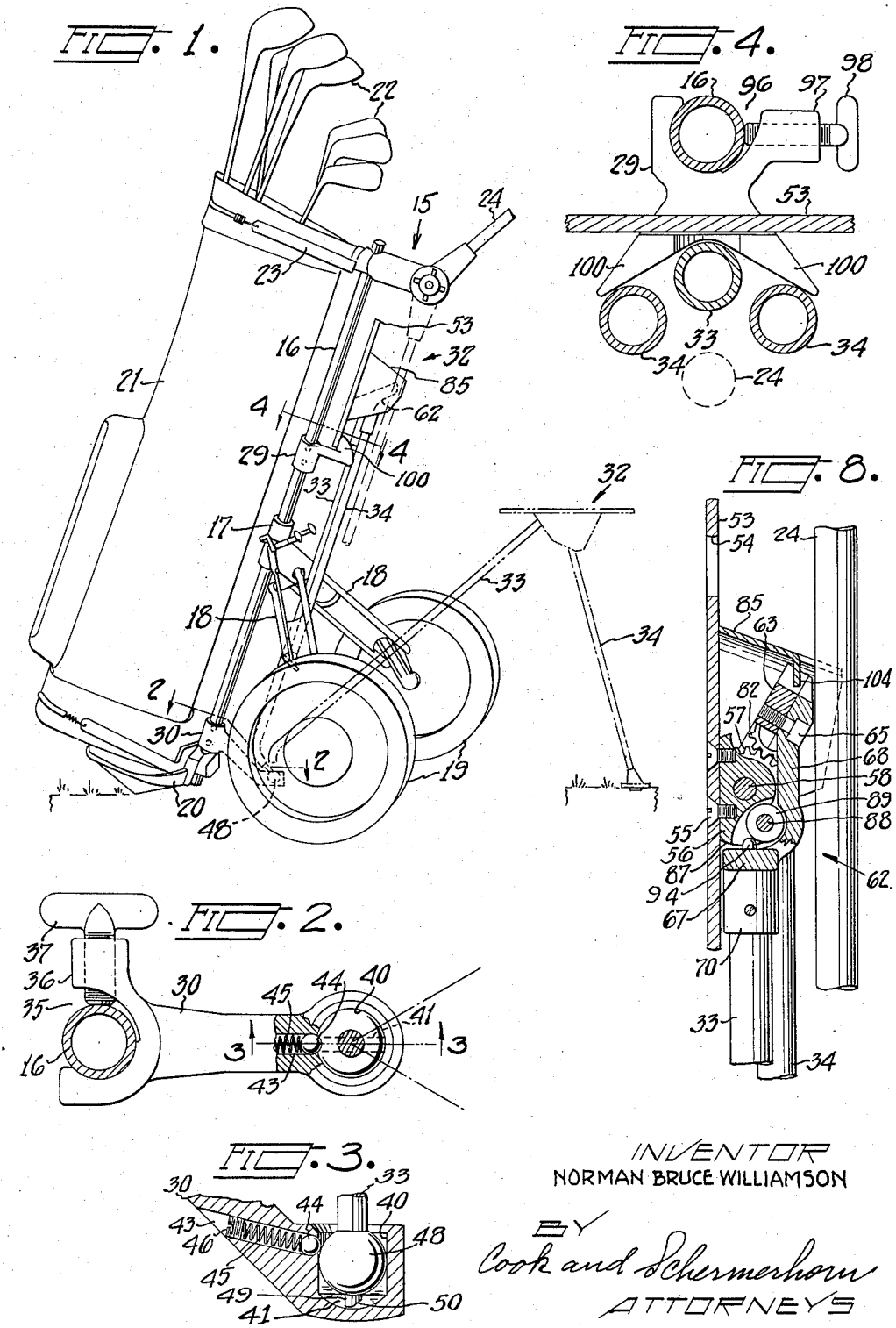

United States Patent Office 2,879,831
Patented Mar. 31, 1959

2,879,831

SEAT ATTACHMENT FOR GOLF CARTS

Norman B. Williamson, Portland, Oreg., assignor to Jarman-Williamson Company, a partnership Application February 10, 1955, Serial No. 487,331

9 Claims. (Cl. 155—80)

This invention relates to improvements in seat attachments for golf carts.

An important object of the invention is to provide a seat attachment for golf carts which is readily movable from an accessible extended position to an out-of-the-way retracted position.

Another object of the invention is to provide a seat attachment for golf carts having improved means adapted to move a seat plate and a plurality of legs into compact parallel relationship with the frame of the golf cart in retracted position of the seat attachment.

A further object is to provide a seat attachment for golf carts employing means for causing a tripod leg assemblage to move from divergent relation in an extended position to parallel relation in retracted position.

A further object is to provide a seat attachment for golf carts having over-center means for urging the attachment into retracted and extended positions.

A further object is to provide a seat attachment for golf carts having means to hold the attachment firmly in retracted position to prevent rattling thereof when the cart is being wheeled on a golf course and to prevent the attachment from swinging out of retracted position.

Further objects are to provide a seat attachment for golf carts which is rugged and durable and yet light in weight; which may be applied to popular types of conventional carts; which is easily attached to and detached from said carts, and which may be used apart from said carts as a spectator's chair or stool.

The invention resides in a seat attachment for golf carts employing a tripod arrangement for supporting a golfer in seated position. The attachment is carried on the frame of a golf cart by a pair of brackets and is movable from a retracted position wherein the three legs are in parallel relation adjacent the golf cart frame to an extended position wherein the legs are moved to divergent relation for engaging the ground. Novel gear means are employed in connection with a seat plate to rotate the legs from their retracted parallel relation to their extended divergent relation, and over-center latch means are provided to urge the parts into retracted and extended positions.

The invention will be better understood and additional objects and advantages will become apparent from the following description taken in connection with the accompanying drawings which illustrate a preferred form of the invention. It is to be understood, however, that the invention may take other forms, and that all such modifications and variations within the scope of the appended claims which will occur to persons skilled in the art are included in the invention.

In the drawings:

Figure 1 is a perspective view of a popular type of golf cart with the present seat attachment mounted thereon;

Figure 2 is a sectional view taken on the line 2—2 of Figure 1, showing one of the brackets secured to the cart frame for removably carrying the seat attachment.

Figure 3 is a fragmentary sectional view taken on the line 3—3 of Figure 2;

Figure 4 is a sectional view taken on the line 4—4 of Figure 1, showing the structure of a second bracket for mounting the attachment on a golf cart;

Figure 5 is a perspective view of the seat attachment removed from the golf cart;

Figure 6 is a top plan view of the seat attachment with the seat plate removed;

Figure 7 is a sectional view taken on the line 7—7 of Figure 6, showing the operating parts and over-center latch mechanism;

Figure 8 is a sectional view similar to Figure 7 but showing the seat attachment in folded position;

Figure 9 is a perspective view of the bottom surface of the seat plate removed from the seat structure;

Figure 10 is a fragmentary bottom plan view of the seat structure showing the general arrangement of the supporting legs and actuating structure therefor, taken on the line 10—10 of Figure 7;

Figure 11 is a sectional view taken on the line 11—11 of Figure 10; and

Figure 12 is a sectional view taken on the line 12—12 of Figure 10.

Referring first to Figure 1, there is shown a golf cart 15 of popular design on which the present attachment may be installed. The cart 15 comprises an upright standard or frame member 16 to which is secured a collar 17 supporting a pair of retractible linkage assemblies 18 carrying ground engaging wheels 19. Secured to the lower end of the standard 16 is a frame assembly 20 for supporting a golf bag 21 containing golf clubs 22, and secured to the upper end of standard 16 are arms 23, for anchoring the top of the bag 21, and a pivotal handle 24 which is adapted to be rotated downwardly in parallel relation with standard 16 when not in use. The linkage assemblies 18 are arranged to fold the wheels up against opposite sides of the golf bag in a well-known manner for carrying or storing the cart and bag.

The present invention will now be described, and, in general, comprises upper and lower brackets 29 and 30, respectively, mounted on the standard 16, Figure 1, and a seat attachment 32 having a connecting member or leg 33 pivotally connecting the seat structure to the lower bracket 30 whereby the seat structure can be moved between a folded position, shown in full lines, and an extended position, shown in phantom. Seat attachment 32 also has a pair of ground contacting legs 34 to assist in supporting the seat on the ground when unfolded or extended for use.

Referring to Figure 2, lower bracket 30 is provided with a semi-circular recess 35 for receiving the standard 16. A wall portion of recess 35 is provided with a threaded boss 36 for receiving a set screw 37 adapted to engage the standard 16 to hold the bracket 30 firmly on the standard in adjusted position. The end of the bracket 30 opposite from the recess 35 is provided with a socket 40 having a groove 41 in its bottom wall extending in a direction rearwardly from the arm of the bracket. Bracket 30 has a bore 43 for receiving a ball detent member 44 held in place by a spring 45 and a screw plug 46. Bore 43 communicates with socket 40 but is restricted in diameter at the point of opening therewith so that ball detent 44 protrudes slightly into the socket 40 but is retained in the bore 43, as shown in Figure 3.

Leg 33 is provided with a ball 48 on its lower end which is adapted to fit in the socket 40 to form a ball and socket joint with the bracket 30. Ball 48 is provided with a downwardly projecting pin 49 which is received in the groove 41 when the ball 48 is inserted in the socket 40, the pin 49 having a beveled edge 50 facing the rear of the seat attachment. The seat structure 32 is readily dismounted from the cart by an upward movement thereof to depress ball detent 44 and disengage the ball 48 from the socket 40. The device is thus readily attached to and detached from a golf cart, and, if desired, can be used for purposes other than for use with a golf cart. When it is attached to the cart it may be swung to either side of handle 24.

The seat attachment 32 is shown in detail in Figures 5-12. A seat plate 53, having a finger slot 54, has secured thereto by screws 55 a gear member 56 having integral bevel gear sectors 57 on each end thereof. Gear member 56 has secured therein a shaft 58 by a set screw 59. Shaft 58 is journalled at its ends in a seat supporting head 62 having a cap plate 63 secured thereto by means of screws 64, 64 and 65. Head 62 comprises a casting assuming the shape shown in Figure 10 having a pair of divergent arms 67, a central curved arm 68, and a boss 70 at the juncture of the three arms to which is secured the leg 33. Arms 67 and cap plate 63 include mating boss portions which enclose and form bearings for the ends of shaft 58.

Between the arms 67 and 68 are bearing collars 76 having bosses 77 for receiving the legs 34. Bearing collars 76 are mounted on shafts 78 journalled between the three arms 67, 68, 67 of head 62 and cap plate 63. Collars 76 are provided with lugs 81 and bevel gear sectors 82 which mesh with the bevel gear sectors 57 on the gear member 56 to cause relative rotation between the seat plate 53, head 62, and legs 34. Cap plate 63 overlies the three arms 67, 68, 67 and is slotted at 75 to receive bearing collars 76 and gears 82. Screws 64 are in the arms 67 and screw 65 is in the arm 68.

Seat plate 53 is rotatable relative to the head 62 by means of shaft 58, and with the present gear arrangement, to be more fully explained hereinafter, when the seat is rotated to folded position, its gears 57 drive gears 82 in the opposite direction to swing legs 34 in toward leg 33. When seat plate 53 is unfolded for use, lugs 81 engage cap plate 63 to stop the outward movement of legs 34, as shown in Figures 10 and 12. A downwardly projecting guard plate 85 prevents a person's fingers from projecting between the seat and cap plate 63 when the seat is opened for use.

Secured to the seat plate 53 and integral with gear member 56 is a bracket 87 in which is journalled a shaft 88, Figures 7 and 12, for carrying a roller 89. Leg 33 is tubular in shape and has an end compartment 90 for slidably receiving a plunger 92 actuated by a spring 93. Secured to plunger 92 is a round nose pin 94 which is slidable through an opening in the closed end of boss 70 and engageable with the roller 89. Spring pressed pin 94 operates in over-center relation with the roller 89 whereby in one over-center position the seat attachment parts are held in open position, as shown in Figure 12, and in the other over-center relation the parts are held in folded position. The tension produced by spring 93 is strong enough to hold the parts in the two positions with sufficient latching action that some force is necessary to move from one position to the other. In the movement of the parts to retracted position wherein the seat plate 53 pivots relative to the head 62, the roller 89 is movable into the inner curved portion of arm 68.

Referring to Figures 1 to 4, the bracket 29 is secured to the standard 16 in a manner similar to the bracket 30. Bracket 29 has a recess 96 for receiving the standard 16 and has a threaded boss 97 for receiving a set screw 98 engageable with the standard. Bracket 29 terminates at its end opposite from the recess 96 in a pair of upturned hooks or ears 100 which serve to hold the seat structure in upward folded position, as shown in Figure 1.

The present seat attachment is movable between the full line position and the phantom line position shown in Figure 1. In the open position thereof the seat plate 53 rests on the cap plate 63 of head 62, and is securely supported thereby for sustaining the weight of an occupant. In this position the legs 33 and 34 are in divergent relation to form a tripod structure by reason of the angular relationship of shafts 78 and the fact that legs 34 are slightly tilted from a perpendicular relationship with their bearing collars 76. A chain 102 secured to the legs limits the divergent relationship thereof and relieves the legs and seat structure from excessive strain due to a tendency of the legs to spread apart when weight is applied to the seat. The bracket 30 is located on the standard 16 in a predetermined position so that when the cart is in rest position the bottom of the bracket 30 engages the ground. The seat structure is thereby supported at three points directly on the ground so that no stresses are imposed upon the golf cart frame. Bracket 30 rises off the ground a sufficient distance when the cart is tilted back to be wheeled so that it will not come into contact with raised portions of the ground.

To fold the seat to the Figure 1 position, the operator grasps the seat plate 53 by the finger slot 54 and pivots the entire mechanism on ball 48 upwardly toward the bracket 29. Upon nearing its upper position, the leading edge of the seat plate abuts against the standard 16, and up to this point there has been no relative pivotal movement between the seat plate and the head 62 and the parts of the seat attachment, relative to each other, remain in the Figure 7 position. Further force on the trailing edge of the seat plate in an upward direction, however, causes the seat plate to pivot relative to the head 62 with the leading edge thereof sliding down the standard 16. Rotation of gear member 56 with the seat plate drives gears 82 in the opposite direction of rotation to rotate the legs 34 down into parallel relation with the standard 16 and leg 33, the relative position of the parts as folded being shown in Figure 8. In fully folded position the lower edge of seat plate 53 moves into a position behind the lugs 100, and the brackets 29 and 30 are spaced apart a predetermined distance such that when the edge of seat plate 53 engages the bracket 29 it exerts a slight upward force on the leg 33 to prevent rattling of the parts when the cart is wheeled over the golf course.

To unfold the seat, the operator grasps the seat plate by means of the finger slot 54 and applies an outward force thereto whereby the seat plate 53 will rotate relative to the head 62 against the action of spring pressed pin 94 and be released from behind the lugs 100. Further rotation thereof causes the legs 34 to swing out toward their open position, and upon nearing their open position the spring pressed pin 94 will cause the three legs to snap into fully open position with the seat plate resting on cap plate 63. Guard plate 85 prevents the operator from getting his fingers caught in the moving parts as the device is extended or retracted.

The construction and relationship of the pin 49 on ball 48 and the groove 41 in the bottom wall of socket 40 accomplish important functions. If the operator should grasp one side of the seat plate instead of the finger slot 54 when he desires to fold the seat attachment, the pin 49 will prevent the seat attachment from tilting sideways, or in other words, will prevent rotation of the leg 33 on a fore and aft horizontal axis. This rotary motion of the seat attachment is prevented because the width of groove 41 is only slightly greater than the diameter of pin 49 and, therefore, the pin cannot rock from side to side in the groove. Another important function of the ball and socket structure is that, while the pin 49 prevents rotary motion of the seat attachment on a fore and aft horizontal axis when the seat is extended directly behind the cart, the bevel 50 on the pin 49 nevertheless permits upward pivotation of the attachment from any of its side positions in a fore and aft vertical plane, the bevel 50 clearing the side walls of the groove 41 during such movement.

The present seat attachment does not interfere with the folding of the cart when not in use. Wheel linkage mechanisms 18 fold upwardly and the handle 24 folds downwardly over the seat, as shown in Figure 8. Guard plate 85 is provided with an inwardly turned tab 104 to prevent the operator from accidentally pinching a finger between a central portion of the head which is recessed and the guard plate.

The invention thus provides a seat for golf carts which may be attached or detached as desired and which is conveniently moved from a retracted out-of-the-way position to an extended position for receiving the weight of a golfer. The attachment is quickly detached from the cart by disengaging the ball 48 from the socket, and may be used as a seat apart from the golf cart as shown in Figure 5.

Having now described my invention and in what manner the same may be used, what I claim as new and desire to protect by Letters Patent is:

1. A collapsible chair structure comprising a seat supporting head, a front leg secured to said head, a seat plate pivotally mounted on said head, a pair of rear legs pivotally mounted on said head and being disposed in one position thereof in downwardly divergent relation, and gear means between said seat and said rear legs whereby upon pivotal movement of said seat plate relative to said head, said rear legs move toward parallel relation.

2. In a golf cart having a frame for supporting a golf bag, a seat supporting head pivotally connected to said frame, a seat plate pivotally mounted on said head, a pair of legs pivotally mounted on said head and being disposed in one position thereof in downwardly divergent relation, and gear means between said seat and said legs whereby upon pivotal movement of said seat plate relative to said head, said legs move toward parallel relation.

3. In a golf cart having an upright frame member for supporting a golf bag, a seat supporting head, a leg secured to said head and pivotally connected to said frame member to move said head between extended and retracted positions, a seat member pivotally mounted on said head, bevel gear means secured to said seat member, and diverging ground engaging legs pivotally connected to said head and having integral bevel gear means in mesh with said first mentioned gear means, said seat member in the retracted position of said head being pivoted to a position parallel to said frame member whereby said gear means move said legs into substantially parallel relation with each other and with said frame member.

4. In a golf cart having a frame structure for supporting a golf bag, a leg pivotally mounted at one end to said frame structure and secured at its other end to a seat supporting head, a seat rotatably mounted on said head, gear means secured to said seat, a pair of legs rotatably mounted on said head, and gears rotatable with said legs and in mesh with said gear means on said seat for causing relative rotation between said seat and said legs.

5. In a golf cart having a frame for supporting a golf bag, a seat supporting head pivotally connected to said frame, a seat pivotally mounted on said head, ground engaging means pivotally mounted on said head, gear means connecting said seat and said ground engaging means for rotating said ground engaging means relative to said head between extended and retracted positions, and over-center latch means for resisting rotation of said ground engaging means when disposed in said extended and retracted positions.

6. In a golf cart having a frame for supporting a golf bag, a seat supporting head, a connecting member pivotally connecting said head to said frame, a seat pivotally mounted on said head, ground engaging means pivotally mounted on said head, gear means connecting said seat and said ground engaging means to move said ground engaging means between extended and retracted positions, and a spring pressed latch between said seat and said head to resist movement of said connecting member away from said extended or retracted positions.

7. In a golf cart having a frame for supporting a golf bag, a lower bracket on said frame having a socket, a folding tripod seat having ground engaging legs and a leg pivoted to the seat and pivotally supported in said socket, an upper bracket on said frame having means engaging said seat in folded position, a spring extended pin in said last leg, and a roller on said seat engageable with the end of said pin in over-center relation for holding said seat in fully folded or unfolded positions.

8. In a golf cart having a frame for supporting a golf bag, a lower bracket on said frame having a socket, said socket having a bottom wall provided with a groove extending longitudinally relative to said bracket, and a folding tripod seat having a pair of ground engaging legs and a third leg pivoted to the seat and having a ball on its lower end engaged in said socket, said ball having a downwardly projecting pin engaged in said groove to prevent said seat attachment from rotating on a fore and aft horizontal axis, said pin being disposed at an angle to said third leg to place said pin in vertical position in said groove when the seat is in use whereby the seat may be pivoted laterally from side to side on the vertical axis of said pin, said pin engaging the walls of said groove to guide said third leg when said leg is raised in folding the seat.

9. A folding tripod seat comprising a first leg having a head portion rigid with the upper end thereof, a seat plate pivotally mounted on said head, a pair of legs pivotally mounted on said head for movement between divergent and parallel positions relative to each other and to said first leg, and gear means interconnecting said seat plate and said pair of legs arranged to move said pair of legs into said parallel position when said seat plate is moved into parallel relation with said first leg.

References Cited in the file of this patent

UNITED STATES PATENTS

| | | |
|---|---|---|
| 246,830 | Spalding | Sept. 6, 1881 |
| 400,623 | Wolber | Apr. 2, 1889 |
| 1,310,566 | Hagner | July 22, 1919 |
| 1,692,685 | Newman | Nov. 20, 1928 |
| 1,783,660 | Maes | Dec. 2, 1930 |
| 1,859,289 | Dalton | May 24, 1932 |
| 2,599,928 | Lyons | June 20, 1952 |
| 2,678,083 | Dall | May 11, 1954 |

FOREIGN PATENTS

| | | |
|---|---|---|
| 18,452 | Great Britain | 1906 |